United States Patent [19]

Wakimoto et al.

[11] Patent Number: 5,067,077
[45] Date of Patent: Nov. 19, 1991

[54] SINGLE CHIP MICROCOMPUTER HAVING UNAUTHORIZED MEMORY SPACE ACCESS PROTECTION

[75] Inventors: Yasuhiro Wakimoto, Yokohama; Tetsuo Suzuki, Tokyo, both of Japan

[73] Assignee: Fujitsu Limited, Kawasaki, Japan

[21] Appl. No.: 671,660

[22] Filed: Mar. 19, 1991

Related U.S. Application Data

[63] Continuation of Ser. No. 285,310, Dec. 15, 1988, abandoned, which is a continuation of Ser. No. 652,074, Sep. 19, 1984, abandoned.

[30] Foreign Application Priority Data

Sep. 22, 1983 [JP] Japan ............................ 58-175977

[51] Int. Cl.[5] ...................... G06F 12/00; G06F 12/14
[52] U.S. Cl. ................................. 395/400; 364/286.4; 364/286.5; 364/232.9; 364/246.6; 364/245.31; 364/DIG. 1
[58] Field of Search ... 364/200 MS File, 900 MS File

[56] References Cited

U.S. PATENT DOCUMENTS

| 4,045,782 | 8/1977 | Anderson et al. | 364/200 |
|---|---|---|---|
| 4,153,933 | 5/1979 | Blume, Jr. et al. | 364/200 |
| 4,368,515 | 1/1983 | Nielsen | 364/200 |
| 4,450,524 | 5/1984 | Oberman | 364/200 |
| 4,504,926 | 3/1985 | Toyoda | 364/900 |
| 4,580,212 | 4/1986 | Hosaka | 364/200 |
| 4,584,665 | 4/1986 | Vrielink | 364/900 |
| 4,698,750 | 10/1987 | Wilkie et al. | 364/200 |
| 4,701,886 | 10/1987 | Sakakibara et al. | 365/189 |

FOREIGN PATENT DOCUMENTS

| 0109504 | 5/1984 | France | 364/200 |
|---|---|---|---|
| 0072219 | 2/1983 | United Kingdom | 364/200 |

OTHER PUBLICATIONS

Gary Fielland, "Keep the Memory Interface Simple", Electronic Design, vol. 9, Apr. 26, 1978, pp0. 84-92.

Primary Examiner—Eddie P. Chan
Attorney, Agent, or Firm—Staas & Halsey

[57] ABSTRACT

A single-chip microcomputer connectable to an external memory for expanding the address space, and having a first mode of operation in which the available memory region is both the region of an internal ROM and the external memory, and having a second mode of operation in which the available memory region is the region of the external memory only. An inhibiting device is provided for inhibiting the switching from the second mode to the first mode, thereby ensuring that the contents of the internal ROM cannot be read-out.

8 Claims, 7 Drawing Sheets

Fig. 4 PRIOR ART

| LABEL | INSTRUCTION | MESSAGE |
|---|---|---|
| $S_1$ RESET | $\overline{EA}a := 0$ | ; RESTART ADDRESS |
| $S_2$ EXT | $\overline{EA}a := 1$ | ; SWITCH $\overline{EA}a$, EXT ADDRESS IS MORE THAN 0FFF |
| $S_3$ | FOR $i = 0$ TO 0FFH<br>$P_1 := M(i)$ | $\left.\begin{array}{l}:\\:\end{array}\right\}$ READ INT. ROM |

80

SINGLE CHIP MICROCOMPUTER HAVING UNAUTHORIZED MEMORY SPACE ACCESS PROTECTION

This is a continuation of co-pending application Ser. No. 07/285,310 filed no Dec. 15, 1988 which is a continuation of application Ser. No. 652,074 filed on Sep. 19, 1984 both now abandoned.

BACKGROUND OF THE INVENTION

(1) Field of the Invention

The present invention relates to a single-chip microcomputer, and more particularly, to a single-chip microcomputer having means for inhibiting read-out of the contents of an internal ROM.

(2) Description of the Prior Art

Generally, in order to expand the available address space, a single-chip microcomputer provided with an internal read-only memory (ROM) can be connected through an interface to an external ROM. The external ROM usually has a first region in which the address space is different from that of the internal ROM for storing programs, and a second region in which the address space is the same as that of the internal ROM. The single-chip microcomputer, when connected to the external ROM, can be switched between a first mode of operation and a second mode of operation, in response to a switching signal, for example, an external access signal used when an external device is accessed. In the first mode of operation, the internal ROM and the second region of the external ROM are accessable. In the second mode of operation, only the external ROM can be accessed unless a specific program such as later described in detail is stored in the external ROM.

In the single-chip microcomputer, when connected to the external ROM, it is desired, in the interests of secrecy, that the contents of the above-mentioned internal ROM cannot be read out to an external device.

Conventionally, countermeasures have been taken to make it impossible to transfer the contents of the internal ROM to an external device by, for example, cutting a fuse between the internal ROM and the external portion, after the contents of the ROM are determined, in the manufacturing process, to be normal.

However, when the second region of the external ROM is accessed in the second mode of operation, the contents of the internal ROM can be easily read out to an external device by switching the external access signal so as to select the first mode of operation, when the second region of the external ROM stores a program for reading out the contents of the internal ROM.

SUMMARY OF THE INVENTION

Accordingly, an object of the present invention is, in a single-chip microcomputer, to make it possible to inhibit read-out of the contents of the internal ROM to an external device.

Another object of the present invention is to maintain the secrecy requirements for the contents of the internal ROM in a single-chip microcomputer.

To attain the above objects, according to the present invention, a single-chip microcomputer is provided comprising an internal read-only memory, a program counter for generating an address and an interface port connectable to an external memory. Also included is switching means for switching, in response to a switching signal, between a first mode in which both the internal read-only memory and the external memory are used and a second mode in which only the external memory is used, and an inhibiting means for inhibiting, when the address output from the program counter indicates an address in an address space other than the address space of the internal read-only memory, input of the switching signal for switching from the second mode to the first mode into the switching means.

BRIEF DESCRIPTION OF THE DRAWINGS

The above objects and features as well as other advantages of the present invention will be made more apparent from the following description of the embodiments with reference to the accompanying drawings, wherein:

FIG. 4 is a program for an undesirable operation for reading out the contents of the internal ROM;

DESCRIPTION OF THE PREFERRED EMBODIMENTS

Figure 1:
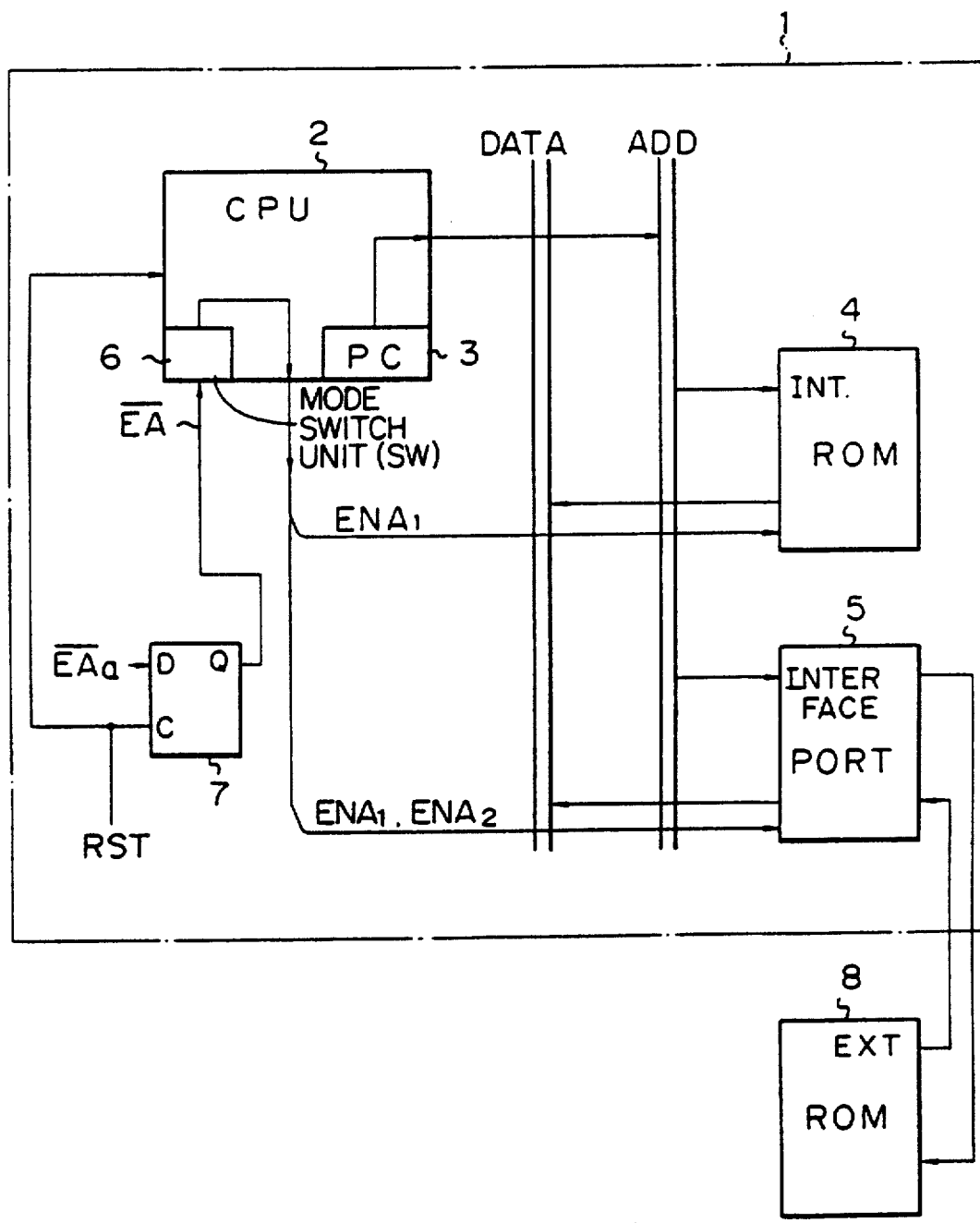
FIG. 1 is a block diagram illustrating a a single-chip microcomputer according to an embodiment of the present invention.

FIG. 1 illustrates a general structure of a single-chip microcomputer, according to an embodiment of the present invention. In FIG. 1, a single-chip microcomputer 1 includes a CPU 2, a program counter 3 included in the CPU 2, an internal ROM 4, an interface port 5, a switching portion or mode switching unit 6 in the CPU 2, an inhibit circuit 7, a data bus DATA and an address bus ADD. The program counter 3 generates an address of a memory location to be accessed. The internal ROM 4 usually stores instructions and fixed data, and the manufacturer usually requires that these instructions or data in the internal ROM be kept secret. The interface port 5 is an interface circuit between the single-chip microcomputer 1 and an external ROM 8 which is provided for expanding the available address space of the single-chip microcomputer 1. At least a part of the address space of the external ROM 8 is identical to the address space of the internal ROM 4. The single-chip microcomputer 1 operates in either one of two modes of operation, i.e., a first mode and a second mode. In the first mode, the available memory region encompasses both the internal ROM 4 and the external ROM 8. In the second mode, the available memory region is only that of the external ROM 8, and the internal ROM 4 is not accessed unless a specific program is stored in the external ROM 8.

The switching portion 6 switches between the first mode and the second mode, in response to, for example, a first external access signal $\overline{EA}$. When the first external access signal $\overline{EA}$ is at logic "1", the switching portion 6 selects the first mode to output a first enable signal $ENA_1$, which is applied to both the internal ROM 4 and the interface port 5. When the first external access signal $\overline{EA}$ is at logic "0", the switching portion 6 selects the second mode to output a second enable signal $ENA_2$, which is applied only to the interface port 5.

The inhibit circuit 7 according to this embodiment is a flip-flop which receives at its data input D a second external access signal $\overline{EAa}$ and at its clock input C a reset signal RST. The second external access signal $\overline{EAa}$ can be generated automatically by the program stored in the internal ROM 4 or in the external ROM 8. The second external access signal $\overline{EAa}$ also can be manually applied by an operator.

The reset signal RST is used to reset the program counter 3 or other modules (not shown) in the CPU 2.

While the reset signal RST is at logic "1", i.e., during reset of the CPU 2, the second external access signal $\overline{EAa}$ is latched to the first external access signal $\overline{EA}$ by the inhibit circuit 7. Therefore, during a period except for the reset period, the first external access signal $\overline{EA}$ is not changed. Accordingly, during the period except for the reset period, changing the mode of operation from the second mode to the first mode is inhibited.

Figure 2:
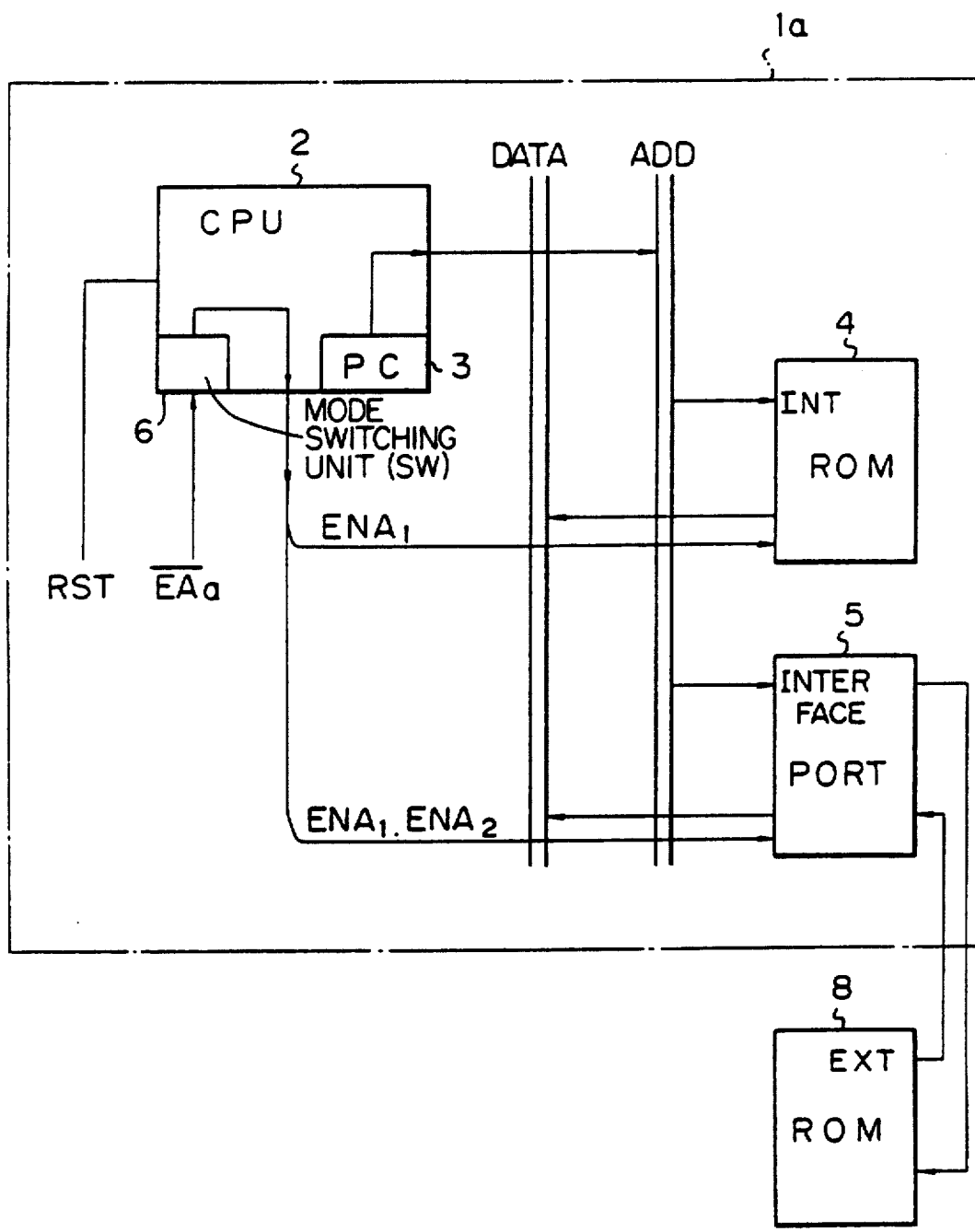
FIG. 2 shows a conventional single-chip microcomputer.

FIG. 2 illustrates a conventional single-chip microcomputer. As shown in FIG. 2, conventionally the inhibit circuit 7 is not provided in the single-chip microcomputer 1a, and the second external access signal $\overline{EAa}$ is directly input to the CPU 2. The problems arising in the conventional single-chip microcomputer 1a will now be explained with reference to FIGS. 2, 3A, 3B, 4, 5, 6A, and 6B.

Figure 3A:
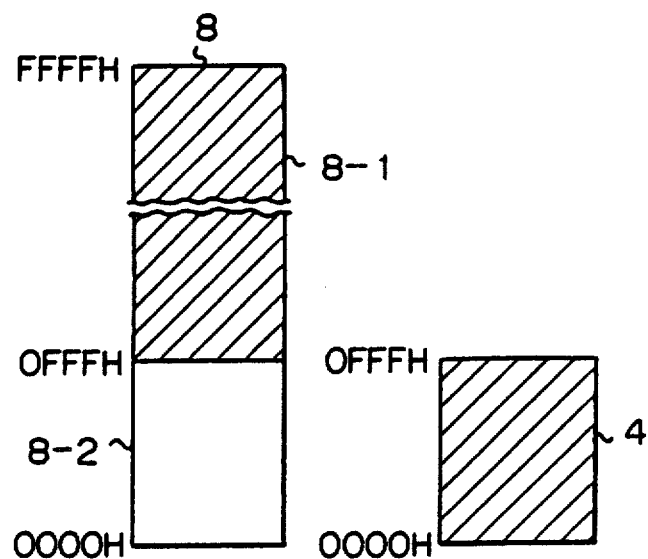
FIG. 3A is a diagram showing an available memory region under, the first mode of operation.
Figure 3B:
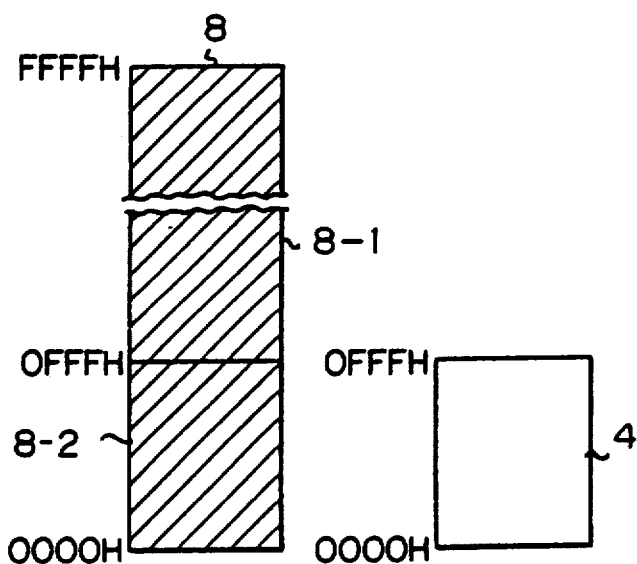
FIG. 3B is a diagram showing an available memory region under, the second mode of operation.

FIGS. 3A and 3B, respectively, show available memory regions under the first and second modes of operation. That is, FIG. 3A corresponds to the case where the external access signal $\overline{EAa}$ is at logic "1", where an internal ROM 4 having a capacity from an address #0000 to, for example, an address #0FFF (hexadecimal), and a first region 8-1 of the external ROM 8 having an address #1000 to an address of #FFFF is utilized during processing. In this case, a restart address is the address #0000 of the internal ROM 4 and a second region 8-2 of the external ROM 8 is not accessed. The second region 8-2 of the external ROM 8 has the same address space as that of the internal ROM 4. On the other hand, FIG. 3B corresponds to the case when the signal $\overline{EAa}$ is at logic "0", wherein the second region 8-2 of the external ROM 8 from the address #0000 to the address #0FFF and the first region 8-1 of the external ROM 8 from the address #1000 to the address #FFFF are utilized for processing. In this case, the restart address is the address #0000 of the second region 8-2 of the external ROM 8 and the internal ROM 4 is not accessed unless a specific program therefor is stored in the external ROM 8.

In the conventional single-chip microcomputer 1a in which the modes of memory usage are directly switchable by means of the external access signal $\overline{EAa}$, as mentioned above, the contents of the internal ROM 4 may be undesirably read-out to an external portion by, for example, a program in the first region 8-1 of the external ROM 8, in a mode, as described later in conjunction with FIGS. 4, 5, 6A, and 6B.

Figure 5:
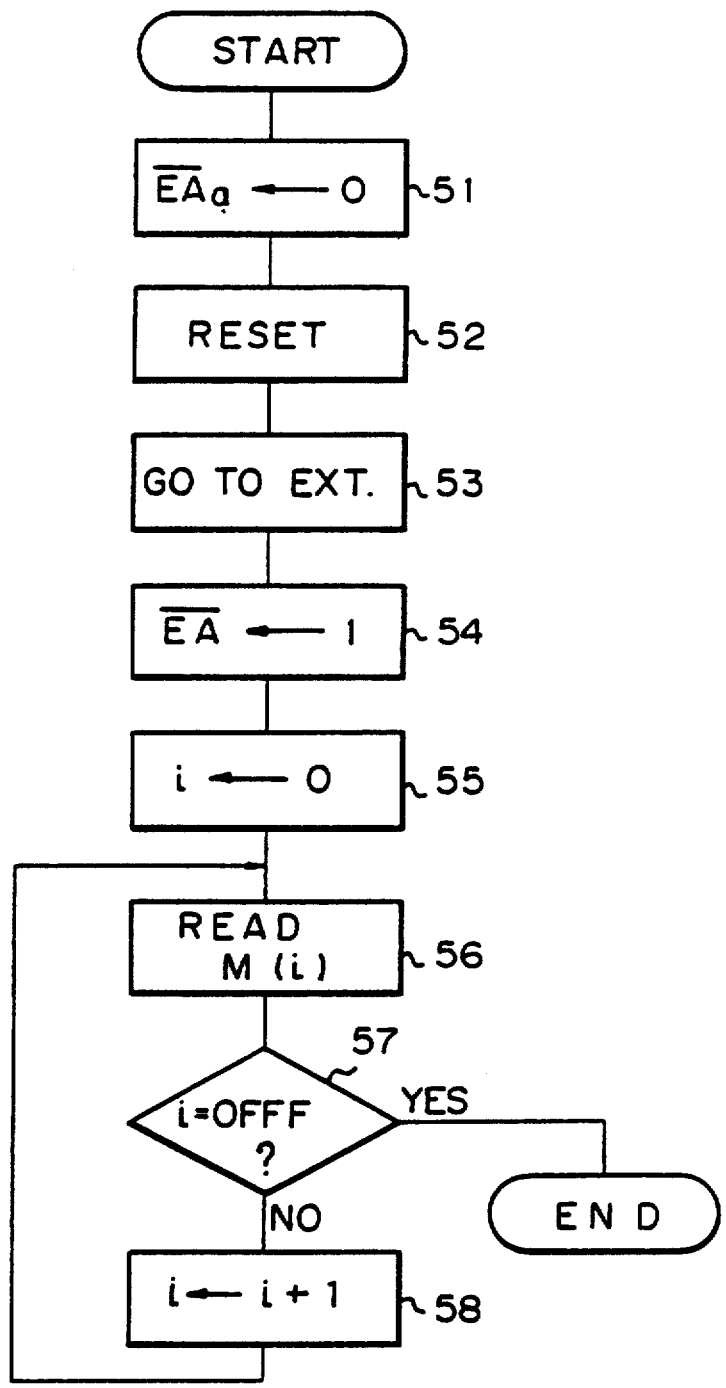
FIG. 5 is a flow chart corresponding to the program shown in FIG. 4.
Figure 6A:
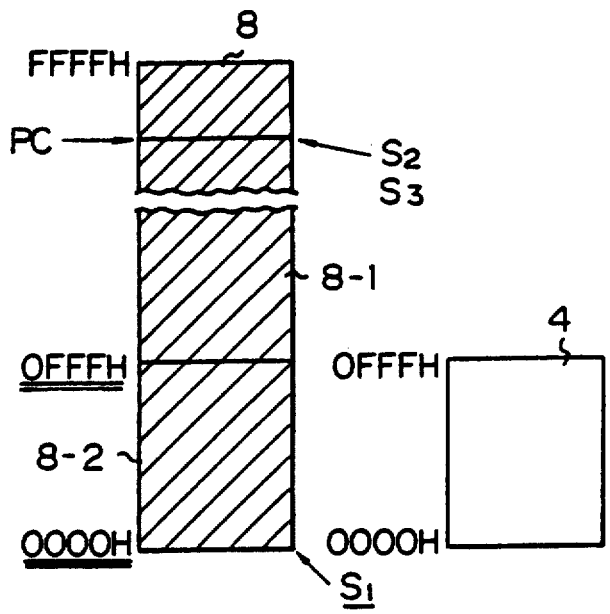
FIG. 6A is a diagram showing the available memory region under the second mode of operation, for explaining the undesirable read-out operation.
Figure 6B:
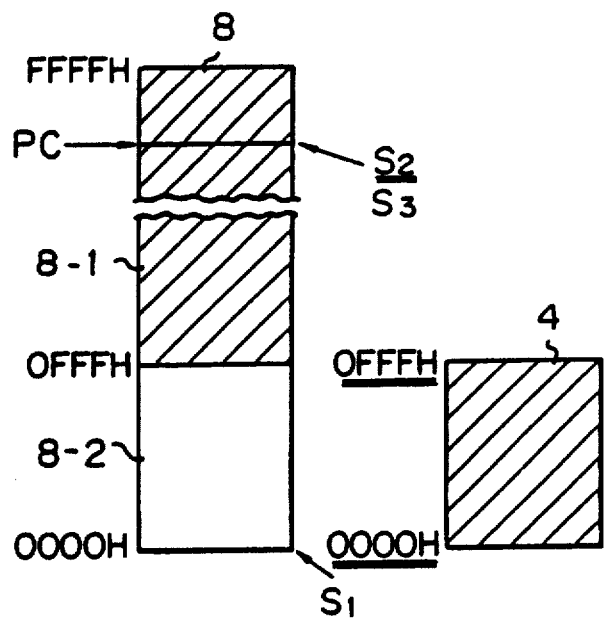
FIG. 6B is a diagram showing the available memory region under the second mode of operation, in which the contents of the internal ROM can be undesirably read out.

That is, a program 80 as shown in FIG. 4 is assumed to be provided in the external ROM 8. The operation executed by the program 80 is shown as a flow chart in FIG. 5. The memory region used in the execution of the program is illustrated by lines in FIGS. 6A and 6B. Referring to FIG. 5, there are eight steps 51 through 58 for reading out the contents of the internal ROM 4 to an external device. In step 51, the external access signal $\overline{EAa}$ is set to "0" to execute the second mode of operation. Then, in the second step 52, the microcomputer 1a is reset. The restart address $S_1$ in this case is, as illustrated in FIG. 6A, the address #0000 in the second region 8-2 of the external ROM 8. Then, in the third step 53, a jump instruction is executed to access an address $S_2$ in the first region 8-1 of the external ROM 8. In the fourth step 54, the external access signal $\overline{EAa}$ is switched from "0" to "1" to execute the first mode of operation. In this case, the address $S_2$ should be more than 0FFF, which is the maximum address in the second region 8-2 of the external ROM 8. Then, in the fifth step 55, a parameter i is set to be "038". Subsequently, as illustrated in FIG. 6B by slashed lines, the internal ROM 4 and the first region 8-1 of the external ROM 8 are utilized. In the sixth step 56, the contents of memory location i are read out. Then, by repeating the steps 56 through 58, the contents M(i) of the internal ROM 4 from its address #0000 to 0FFF are read out to, for example, an external device through the interface port 5. In FIG. 4, the symbol P1 represents the interface port 5 which receives the contents M(i). The addresses in which the contents of the internal ROM 4 are stored are represented by a symbol $S_3$.

The reason why the contents of the internal ROM 1 can be transferred in the above-mentioned fashion, as explained with reference to FIGS. 4, 5, 6A, and 6B, is because the external access signal $\overline{EAa}$ can be switched for the purpose of reading out the contents of the internal ROM 4, after an operation is once started from the restart address #0000 of the second region 8-2 of the external ROM 8 under the second mode of operation, i.e., under $\overline{EAa}=0$.

In contrary, according to the first embodiment shown in FIG. 1, since the second external signal $\overline{EAa}$ is inhibited from input into the CPU 2 during the period except for when the reset signal RST is generated, the mode of operation cannot be changed from the second mode of operation to the first mode of operation after start of execution. In other words, when the second external access signal $\overline{EAa}$ having a logic "0∞ is applied to the inhibit circuit 7 while the reset signal RST is applied, the signal $\overline{EAa}$ having logic "0" is latched or stored even after the reset signal RST is removed. Accordingly, after the reset signal RST is removed, the first external access signal $\overline{EA}$ is not changed even when the second external access signal $\overline{EAa}$ is changed from "0" to "1".

It should be noted, for the FIG. 1 embodiment that the internal ROM 4 should contain a program which does not require access to the first region 8-1 of the external ROM 8. By employing such a program in the internal ROM 4, the program counter does not designate the first region 8-1 of the external ROM 8 during the first mode of operation. Therefore, in the first mode of operation also, the contents of the internal ROM 4 cannot be read out.

Figure 7:
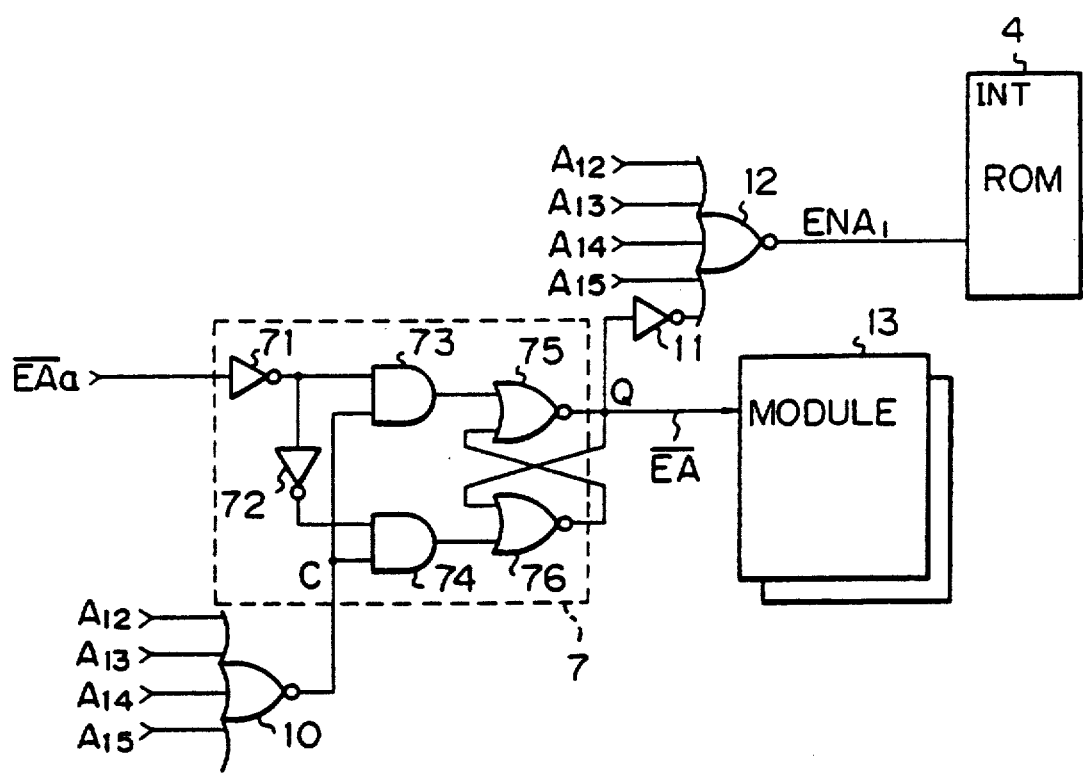
FIG. 7 is a logic circuit diagram of an inhibit circuit according to another embodiment of the present invention.

FIG. 7 illustrates another embodiment of the present invention. In FIG. 7, the flip-flop 7 shown in FIG. 1 is shown in more detail. In this second embodiment, address signals $A_{12}$ through $A_{15}$ are employed in place of the reset signal RST. This is the only difference between the first and the second embodiments. The address space of the external ROM 8 is, as shown in, for example, FIG. 3B, from #0000 to #FFFF in hexadecimal expression. Each of the four characters in the hexadecimal expression can be broken down into 4 bits. Therefore, any address in the external ROM 8 can be expressed by using sixteen bits $A_0$ through $A_{15}$. The addresses for first region 8-1 of the external ROM 8 are always more than or equal to the address #1000 in hexadecimal. Therefore, to determine whether or not the address in the external ROM 8 is in the first region 8-1, it is sufficient to supervise or monitor the values of the most significant character in the hexadecimal expression. The most significant character is expressed by the four bits $A_{12}$ through $A_{15}$; which is why the four bits $A_{12}$ through $A_{15}$ are employed.

The four most significant bits $A_{12}$ through $A_{15}$ are applied to a NOR gate 10. The output of the NOR gate 10 is input as a clock signal to the flip-flop 7. The output Q of the flip-flop 7 is applied through an inverter 11 to another NOR gate 12. The NOR gate 12 also receives the four significant bits $A_{12}$ through $A_{15}$. The output signal of the NOR gate 12 is applied as an enable signal $ENA_1$ to the internal ROM 4. The output Q of the flip-flop 7 is also applied to modules 13, which also utilize the external access signal $\overline{EA}$.

The flip-flop 7 includes inverters 71 and 72, AND gates 73 and 74, and OR gates 75 and 76.

In operation, when at least one of the four most significant bits $A_{12}$ through $A_{15}$ is at logic "1", the AND gates 73 and 74 are closed so that the second external access signal $\overline{EAa}$ is inhibited from input into the flip-flop 7. Therefore, the output Q of the flipflop 7 is not switched. Regardless of the output Q of the flip-flop 7, since one of the four most significant bits $A_{12}$ through $A_{15}$ is "1", the output of the NOR gate 12, i.e., the enable signal $ENA_1$, is "0", and the internal ROM 4 is not accessed.

When all of the four most significant bits $A_{12}$ through $A_{15}$ are "0", the available address space is from #0000 to #0FFF. In this state, the clock input C of the flip-flop 7 is "1", and the first external access signal $\overline{EA}$ can be switched from "1" to "0" or "0" to "1" in response to the second external access signal. However, when the first external access signal $\overline{EA}$ is switched from "0" to "1", the available address space is also turned from the second region 8-2 of the external ROM 8 to the internal ROM 4, and therefore, the contents of the ROM 4 cannot be read out. Also, when the first external access signal $\overline{EA}$ is switched from "1" to "0", only the external ROM 8 is read out, and therefore, the contents of the internal ROM 4 cannot be read out.

The present invention is not limited to the above-described embodiments, but various changes and modifications are possible without departing from the spirit of the invention. For example, the memory regions of the internal ROM and the external ROM may be of any scale. Also, an external random-access memory (RAM) may be employed in place of the external ROM. Further, any other inhibiting means may be employed in place of the flip-flop 7.

From the foregoing description, it will be apparent that, according to the present invention, in a single-chip microcomputer, the contents of the internal ROM cannot be read-out to an external device, and the secrecy requirements for the contents of the internal ROM can be properly maintained.

We claim:

1. A single-chip microcomputer connectable to an external memory having first and second address spaces and comprising:
    an internal read-only memory having said second address space;
    a central processor, operatively connected to said internal read-only memory, operating in a first mode to access said internal read-only memory and said first address space of said external memory and a second mode to access said first and second address spaces of said external memory said central processor including:
        a program counter for generating an address used to access said external memory, and
        switching means for switching, in response to a switching signal, between the first mode and the second mode; and
    inhibiting means, connected to said switching means, for receiving an input the switching signal and the address generated by said program counter, and for inhibiting, when the address is in said first address space only, output of said switching signal as input to said switching means to prevent switching from said second mode to said first mode.

2. A single chip microcomputer as set forth in claim 1, wherein
    said inhibiting means inhibits switching to the first mode when an external access signal is input and an address inside a predetermined address space is generated by said central processing unit.

3. A single chip microcomputer as set forth in claim 2, wherein said inhibiting means comprises:
    a first NOR gate having an input for receiving the generated address and having an output;
    a flip-flop having a first input connected to the output of said first NOR gate, a second input for receiving the external access signal and an output connected to the external memory;
    an inverter connected the output of said flip-flop; and
    a second NOR gate having a first input connected to said inverter, an output connected to said internal read-only memory and a second input for receiving the generated address.

4. A single chip microcomputer operatively connected to an external memory and comprising:
    an interface operatively connected to the external memory;
    an internal read-only memory;
    a central processing unit, operatively connected to said interface and said internal read-only memory, for determining first and second modes in dependence upon a program or operator generated external access signal, accessing said internal memory and the external memory in the first mode and accessing only the external memory in the second mode and operating in a first mode to access said internal read-only memory and said first address space of said external memory and a second mode to access said first and second address spaces of said external memory, said central processor comprising a program counter for generating an address for accessing said external memory, said program counter being reset in response to a reset signal indicating whether to restart processing from an address in said first address space; and switching means for receiving a switching signal and for controlling switching between said first mode and said second mode; and inhibiting means, operatively connected to said central processing unit, for receiving the switching signal and said reset signal, and for inhibiting said switching means from switching from said second mode to said first mode in response to said reset signal indicating not to restart processing from an address in said first address space, by inhibiting output of the switching signal as input to said switching means.

5. A single chip microcomputer as set forth in claim 4, wherein said inhibiting means comprises a flip-flop.

6. A single-chip microcomputer, comprising:
an internal read-only memory having a first address space;
an external memory having said first address space and a second address space;
a central processing unit, operatively connected to said internal read-only memory and said external memory, operating in a first mode to access said internal read-only memory and the second address space of said external memory and operating in a second mode to access the first address and second address spaces of said external memory, said central processing unit including a counter for generating an address for accessing said external memory;
switching means for switching between the first mode and the second mode in response to a switching signal; and
inhibiting means, connected to said switching means, for receiving as input the switching signal and the address generated by said program counter, and for inhibiting the switching from the second mode to the first mode by inhibiting output of the switching signal as input to said switching means when the address output by said counter is within the second address space.

7. A single-chip microcomputer, comprising:
an internal read-only memory having a first address space;
an external memory having said first address space and a second address space;
a central processing unit, operatively connected to said internal read-only memory and said external memory, operating in a first mode to access said internal read-only memory and the second address space of said external memory and operating in a second mode to access the first address space and second address space of said external memory, said central processing unit including a counter for generating an address for accessing said external memory, said counter being reset in response to a reset signal indicating whether to restart from an address in the first address space;

switching means for receiving a switching signal for controlling switching between the first mode and the second mode; and inhibiting means for receiving said switching signal and said reset signal, and for allowing output of said switching signal as input to said switching means for controlling switching from said second mode to said first mode only when said reset signal supplied to said inhibiting means indicates restart from the address in the first address space.

8. A single-chip microcomputer, comprising:
an internal read-only memory having a first address space;
an external memory having said first address space and a second address space;
a central processing unit, operatively connected to said internal read-only memory and said external memory, operating in a first mode to access said internal read-only memory and the second address space of said external memory and operating in a second mode to access the first address and second address spaces of said external memory, said central processing unit including a counter for generating an address for accessing said external memory;
switching means for switching between the first mode and the second mode in response to a switching signal;
inhibiting means for inhibiting the switching by said switching means, said inhibiting means having a first gate and a second gate having an output connected to said switching means, said first gate having a plurality of address signal lines connected to said counter, said address signal lines transferring a pat of an address signal for designating said second address space of said external memory, said first gate outputting a disable signal when said address signal designates said second address space of said external memory, said second gate closing in response to said disable signal so that said switching signal for switching from said second mode to said first mode is inhibited from being applied to said switching means.

* * * * *